US012608028B2

(12) United States Patent
He et al.

(10) Patent No.: US 12,608,028 B2
(45) Date of Patent: Apr. 21, 2026

(54) MANAGING SOUND LEVELS AT AN INFORMATION HANDLING SYSTEM

(71) Applicant: Dell Products L.P., Round Rock, TX (US)

(72) Inventors: Qinghong He, Austin, TX (US); Travis C North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 372 days.

(21) Appl. No.: 18/349,369

(22) Filed: Jul. 10, 2023

(65) Prior Publication Data

US 2025/0021112 A1 Jan. 16, 2025

(51) Int. Cl.
*G06F 3/16* (2006.01)
*G05D 13/02* (2006.01)

(52) U.S. Cl.
CPC .............. *G05D 13/02* (2013.01); *G06F 3/16* (2013.01)

(58) Field of Classification Search
CPC ........... G05D 13/02; G06F 3/16; G06F 1/206; G06F 1/20; G05B 15/02; G01K 13/00; H04R 29/00; H05K 7/20209; F04D 29/663; F05D 2270/333
See application file for complete search history.

(56) References Cited

U.S. PATENT DOCUMENTS

| | | | | |
|---|---|---|---|---|
| 6,125,288 A | * | 9/2000 | Imai ..................... | H04M 1/6016 |
| | | | | 379/388.04 |
| 7,941,231 B1 | * | 5/2011 | Dunn ...................... | G06F 1/203 |
| | | | | 73/514.01 |
| 7,974,743 B2 | * | 7/2011 | Nakashima ............. | G06F 1/206 |
| | | | | 713/323 |

(Continued)

FOREIGN PATENT DOCUMENTS

| | | | | | |
|---|---|---|---|---|---|
| CN | 1279556 A | * | 1/2001 | .......... | G10L 19/012 |
| CN | 115704399 A | * | 2/2023 | | |
| WO | WO-2023043436 A1 | * | 3/2023 | ............... | G01H 3/12 |

OTHER PUBLICATIONS

Sound Measurement Terminology, Nov. 30, 2021, retrieved from—https://web.archive.org/web/20211130175216/https://www.larsondavis.com/learn/sound-vibe-basics/sound-measurement-terminology, 12 pages (Year: 2021).*

(Continued)

*Primary Examiner* — Yongjia Pan
(74) *Attorney, Agent, or Firm* — McDermott Will & Schulte LLP

(57) ABSTRACT

Managing sound levels at an IHS, including determining, for each time duration over a first time period, multiple instantaneous sound levels of the time duration of an environment of the IHS; calculating, for each time duration over first time period, an average sound level of the time duration based on the multiple instantaneous sound levels of the time duration; determining, based on the average sound level of each time (Continued)

600

Determine Instantaneous Sound Levels of Time Duration 602

Calculate Average Sound Level of Time Duration 604

Determine Lowest Average Sound Level for Time Period 606

Set Lowest Average Sound Level as Ambient Sound Level 608

Adjust Fan Speed of Fan Based on Ambient Sound Level 610 duration over the first time period, a lowest average first sound level for first time period; setting the lowest average first sound level as an ambient sound level of the environment of the IHS for the first time period; adjusting, for the first time period, a fan speed of a fan based on the ambient sound level of environment such that a noise level of the fan is less than the ambient sound level of environment for the first time period.

18 Claims, 8 Drawing Sheets

(56) References Cited

U.S. PATENT DOCUMENTS

| | | | | |
|---|---|---|---|---|
| 8,085,948 | B2 * | 12/2011 | Thomas | G10K 11/17823 |
| | | | | 381/71.7 |
| 8,295,504 | B2 * | 10/2012 | Ady | G11B 33/142 |
| | | | | 700/94 |
| 8,515,095 | B2 * | 8/2013 | Bard | G06F 1/206 |
| | | | | 381/94.1 |
| 9,552,804 | B2 * | 1/2017 | Costa | G06F 1/20 |
| 10,061,332 | B2 * | 8/2018 | North | G06F 1/206 |
| 10,888,022 | B2 * | 1/2021 | Chen | G06F 1/20 |
| 2008/0269920 | A1 * | 10/2008 | Langgood | G06F 1/206 |
| | | | | 700/34 |
| 2009/0002939 | A1 * | 1/2009 | Baugh | G06F 1/206 |
| | | | | 361/679.48 |
| 2016/0013745 | A1 * | 1/2016 | North | H02P 7/2913 |
| | | | | 318/460 |
| 2016/0171967 | A1 * | 6/2016 | Giaimo, III | G10K 11/17873 |
| | | | | 381/56 |
| 2017/0219240 | A1 * | 8/2017 | Cassini | G06F 1/206 |
| 2019/0008074 | A1 * | 1/2019 | Chen | G05D 23/1917 |
| 2019/0310694 | A1 * | 10/2019 | Davis | G01K 13/00 |
| 2021/0149465 | A1 * | 5/2021 | Hiltner | G06F 1/206 |
| 2022/0147128 | A1 * | 5/2022 | Stevens | F04D 29/663 |
| 2023/0413472 | A1 * | 12/2023 | Campo | H05K 7/20172 |
| 2024/0427389 | A1 * | 12/2024 | Huang | F04D 29/661 |

OTHER PUBLICATIONS

Instruction Manual Sound Level Meter NL-21/NL-31, Mar. 5, 2021, retreived from—https://web.archive.org/web/20210305223500/https://www.noisemeasurement.com.au/downloads/NL-21.pdf, 3 pages (Year: 2021).*

* cited by examiner

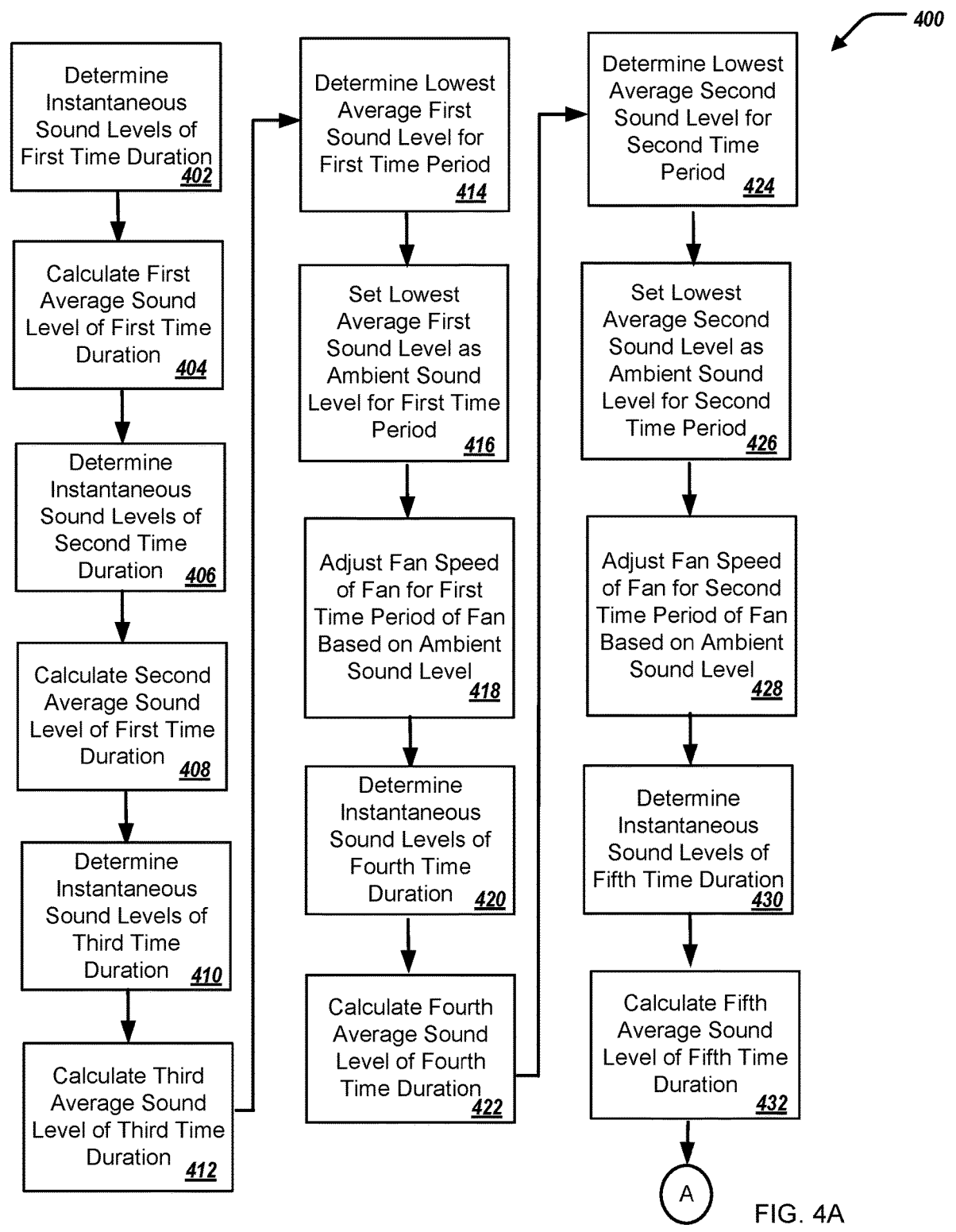

400

Determine Instantaneous Sound Levels of First Time Duration 402

Calculate First Average Sound Level of First Time Duration 404

Determine Instantaneous Sound Levels of Second Time Duration 406

Calculate Second Average Sound Level of First Time Duration 408

Determine Instantaneous Sound Levels of Third Time Duration 410

Calculate Third Average Sound Level of Third Time Duration 412

Determine Lowest Average First Sound Level for First Time Period 414

Set Lowest Average First Sound Level as Ambient Sound Level for First Time Period 416

Adjust Fan Speed of Fan for First Time Period of Fan Based on Ambient Sound Level 418

Determine Instantaneous Sound Levels of Fourth Time Duration 420

Calculate Fourth Average Sound Level of Fourth Time Duration 422

Determine Lowest Average Second Sound Level for Second Time Period 424

Set Lowest Average Second Sound Level as Ambient Sound Level for Second Time Period 426

Adjust Fan Speed of Fan for Second Time Period of Fan Based on Ambient Sound Level 428

Determine Instantaneous Sound Levels of Fifth Time Duration 430

Calculate Fifth Average Sound Level of Fifth Time Duration 432

Determine
Instantaneous
Sound Levels of
Time Duration
*602*

Calculate Average
Sound Level of
Time Duration
*604*

Determine Lowest
Average Sound
Level for Time
Period  *606*

Set Lowest
Average Sound
Level as Ambient
Sound Level
*608*

Adjust Fan Speed
of Fan Based on
Ambient Sound
Level
*610*

MANAGING SOUND LEVELS AT AN INFORMATION HANDLING SYSTEM

BACKGROUND

Field of the Disclosure

The disclosure relates generally to an information handling system, and in particular, managing sound levels at the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing sound levels at an information handling system, including determining, for each time duration of multiple time durations over a first time period, multiple instantaneous sound levels of the time duration of an environment of the information handling system; calculating, for each time duration of the multiple time durations over the first time period, an average sound level of the time duration based on the multiple instantaneous sound levels of the time duration; determining, based on the average sound level of each time duration of the multiple time durations over the first time period, a lowest average first sound level for the first time period; setting the lowest average first sound level as an ambient sound level of the environment of the information handling system for the first time period; and adjusting, for the first time period, a fan speed of a fan of the information handling system based on the ambient sound level of environment such that a noise level of the fan is less than the ambient sound level of the environment for the first time period.

Other embodiments of these aspects include corresponding systems, apparatus, and computer programs, configured to perform the actions of the methods, encoded on computer storage devices.

These and other embodiments may each optionally include one or more of the following features. For instance, determining, for each time duration of multiple time durations over a second time period, multiple instantaneous sound levels of the time duration of the environment of the information handling system; calculating, for each time duration of the multiple time durations over the second time period, an average sound level of the time duration based on the multiple instantaneous sound levels of the time duration; determining, based on the average sound level of each time duration of the multiple time durations over the second time period, a lowest average second sound level for the second time period; setting the lowest average second sound level as the ambient sound level of the environment of the information handling system for the second time period; and adjusting, for the second time period, the fan speed of the fan of the information handling system based on the ambient sound level of environment such that the noise level of the fan is less than the ambient sound level of the environment for the second time period, wherein the second time period partially overlaps with the first time period. Determining, for each time duration of multiple time durations over a third time period, multiple instantaneous sound levels of the time duration of the environment of the information handling system; calculating, for each time duration of the multiple time durations over the third time period, an average sound level of the time duration based on the multiple instantaneous sound levels during the time duration; determining, based on the average sound level of each time duration of the multiple time durations over the third time period, a lowest average third sound level for the third time period; setting the lowest average third sound level as the ambient sound level of the environment of the information handling system for the third time period; and adjusting, for the third time period, the fan speed of the fan of the information handling system based on the ambient sound level of environment such that the noise level of the fan is less than the ambient sound level of the environment for the third time period, wherein the third time period partially overlaps with the second time period. The third time period partially overlaps with the first time period. The first time period includes a first time duration, a second time duration, and a third time duration, the method further including calculating, for the first time duration, a first average sound level of the first time duration based on the multiple instantaneous sound levels during the first time duration, wherein the first average sound level is within a first magnitude range; calculating, for the second time duration after the first time duration, a second average sound level of the second time duration based on the multiple instantaneous sound levels during the second time duration, wherein the second average sound level is within a second magnitude range greater than the first magnitude range; calculating, for the third time duration after the second time duration, a third average sound level of the third time duration based on the multiple instantaneous sound levels during the third time duration, wherein the third average sound level is within the second magnitude range; and determining, based on the first average sound level, the second average sound level, and the third average sound level, the lowest average first sound level for the first time period, wherein the lowest average first sound level for the first time period is within the first magnitude range. The second time period includes the second time duration, the third time duration, and a fourth time duration, the method further including calculating, for the fourth time duration after the third time duration, a fourth average sound level of the fourth time duration based on the multiple instantaneous sound levels during the fourth time duration, wherein the fourth average sound level is within the second magnitude range; and determining, based on the second average sound level, the third average sound level, and the fourth average sound level, the lowest average second sound level for the second time period, wherein the lowest average second sound level for the second time period is within the second magnitude range. The third time period includes the third time duration, the fourth time duration, and a fifth time duration, the method further including further including: calculating, for the fifth time duration after the fourth time duration, a fifth average sound level of the fifth time duration based on the multiple instantaneous sound levels during the fifth time duration, wherein the fifth average sound level is within the first magnitude range; and determining, based on the third average sound level, the fourth average sound level, and the fifth average sound level, the lowest average third sound level for the third time period, wherein the lowest average third sound level for the third time period is within the first magnitude range. Each of the time durations is less than the first time period. Each of the time durations is approximately 0.2 seconds and the first time period is approximately 60 seconds. Each of the time durations is approximately 0.1 seconds and the first time period is approximately 60 seconds.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 4A-4C illustrates a method for managing sound levels at the information handling system.

DESCRIPTION OF PARTICULAR EMBODIMENT(S)

Figure 1:
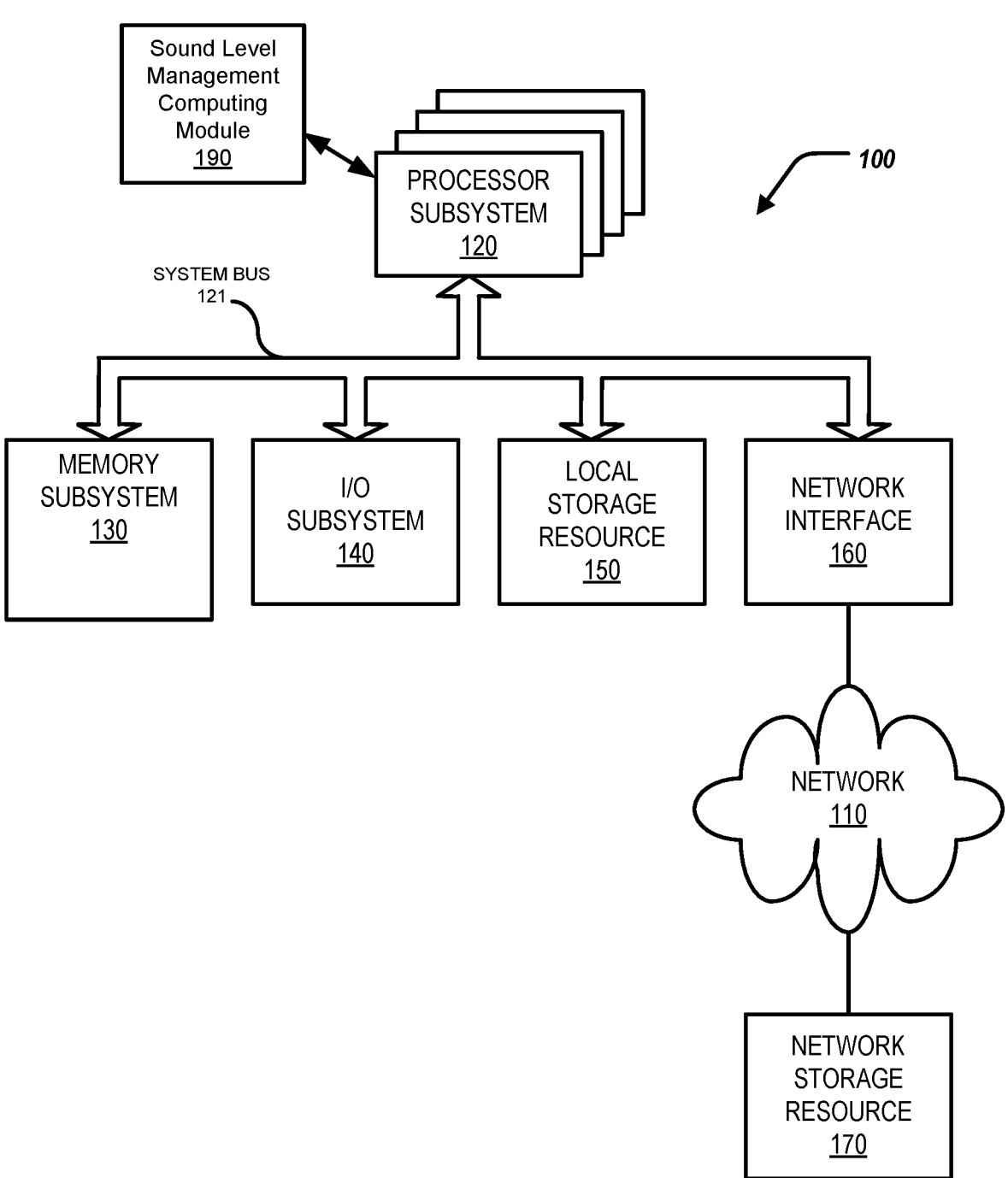
FIG. 1 is a block diagram of selected elements of an embodiment of an information handling system.

This disclosure discusses methods and systems for managing sounds levels at an information handling system. In short, an ambient noise indicator can be raised slowly in view of increasing sound levels, while being decreased rapidly once decreasing sound levels are detected.

Specifically, this disclosure discusses a system and a method for managing sound levels at an information handling system, including: determining, for each time duration of multiple time durations over a first time period, multiple instantaneous sound levels of the time duration of an environment of the information handling system; calculating, for each time duration of the multiple time durations over the first time period, an average sound level of the time duration based on the multiple instantaneous sound levels of the time duration; determining, based on the average sound level of each time duration of the multiple time durations over the first time period, a lowest average first sound level for the first time period; setting the lowest average first sound level as an ambient sound level of the environment of the information handling system for the first time period; and adjusting, for the first time period, a fan speed of a fan of the information handling system based on the ambient sound level of environment such that a noise level of the fan is less than the ambient sound level of the environment for the first time period.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (ISCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a sound level management computing module 190. The sound level management computing module 190 can be included by the processor subsystem 120, or coupled with the processor subsystem 120.

In short, the sound level management computing module 190 can raise an ambient noise indicator slowly in view of increasing sound levels, while decreasing the ambient noise indicator rapidly once decreasing sound levels are detected.

Figure 2:
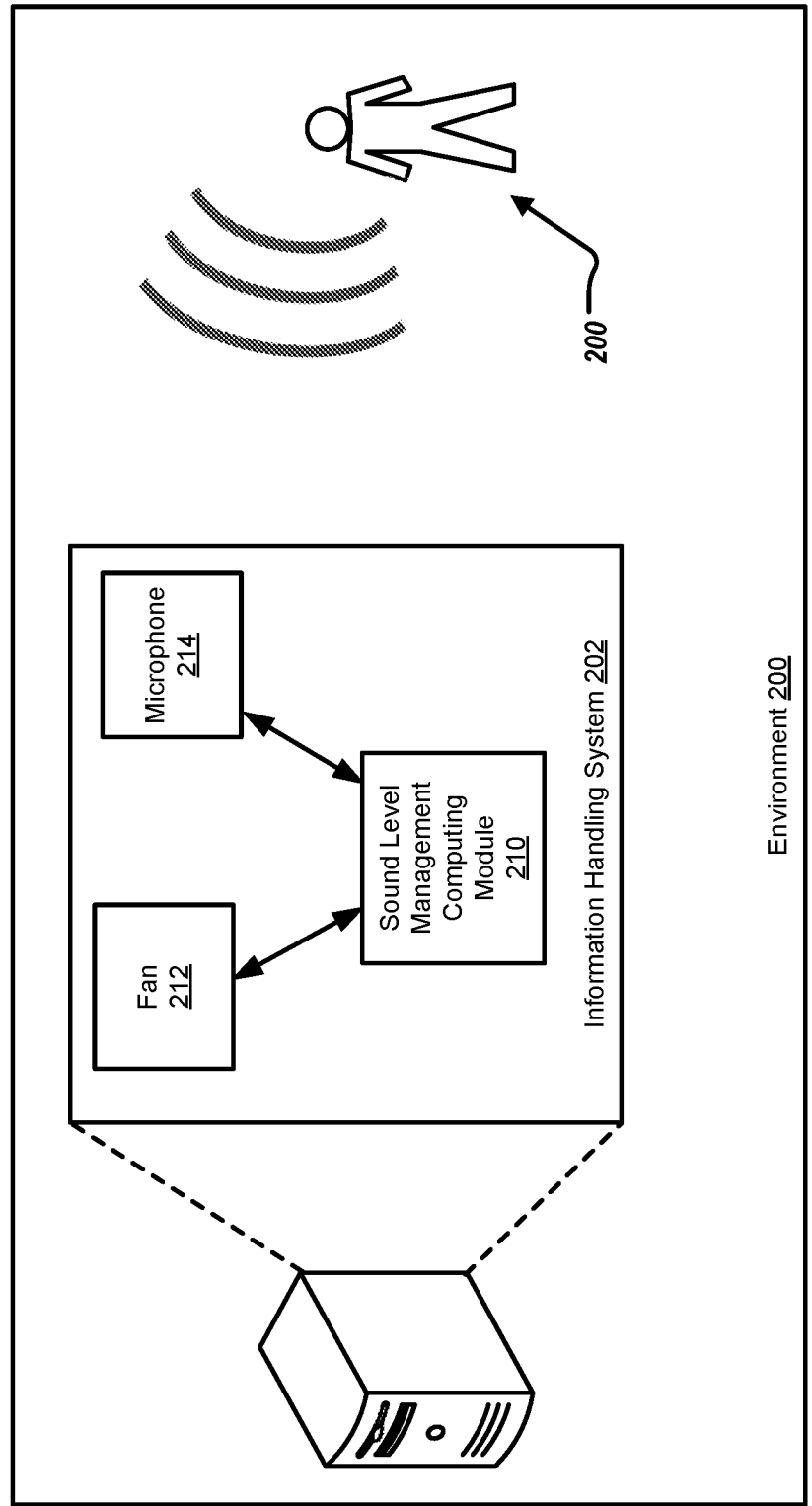
FIG. 2 illustrates a block diagram of an information handling system for managing sound levels at the information handling system.

Turning to FIG. 2, FIG. 2 illustrates an environment 200 including an information handling system 202. The information handling system 202 can include a sound level management computing module 210, a fan 212, and a microphone 214. In some examples, the information handling system 202 is similar to, or includes, the information handling system 100 of FIG. 1. In some examples, the sound level management computing module 210 is the same, or substantially the same, as the sound level management computing module 190 of FIG. 1.

The sound level management computing module 210 can be in communication with the fan 212 and the microphone 214.

The fan 212 is configured to provide cooling of the information handling system 202, and in particular, components of the information handling system 202.

The microphone 214 is configured to record or monitor noise levels of the environment 200 and at the information handling system 202.

Figure 3:
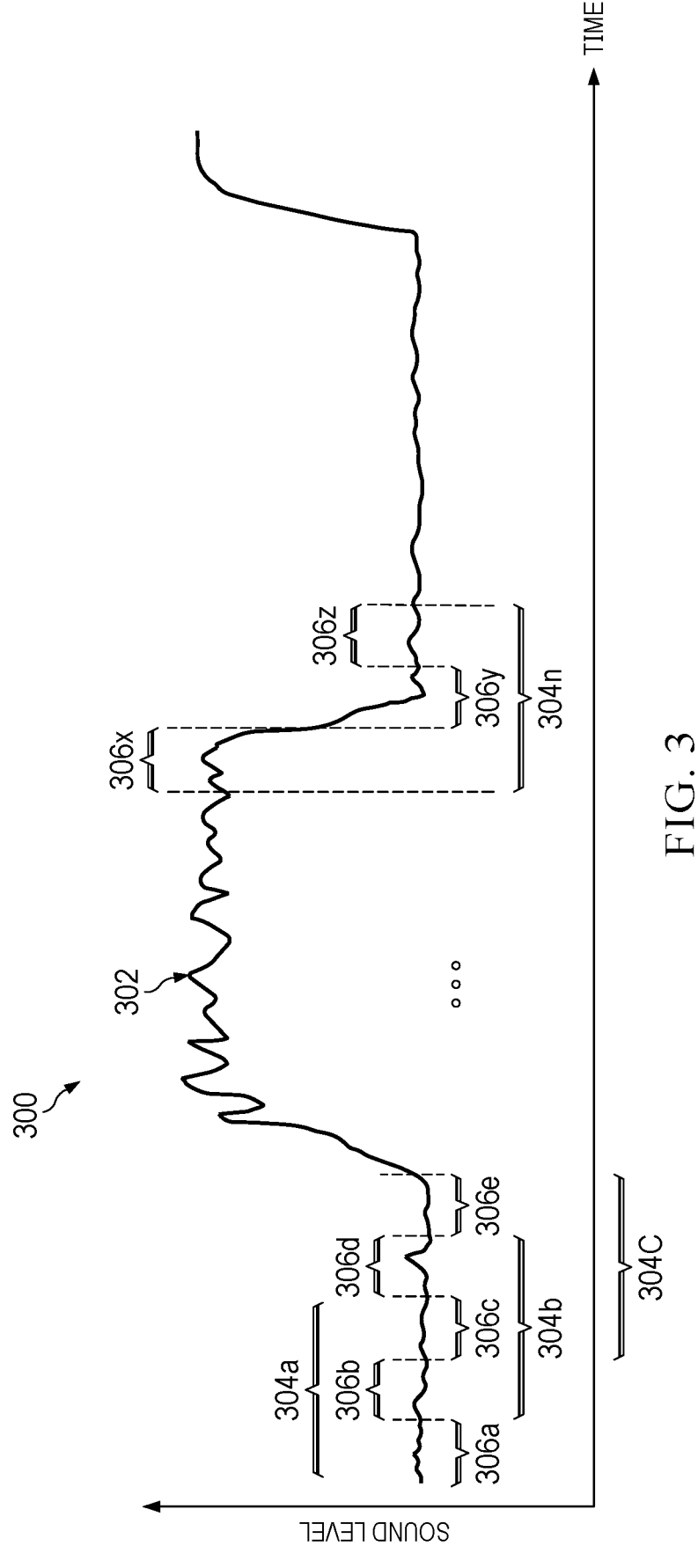
FIGS. 3, 5 illustrate respective graphs of noise levels of an environment of the information handling system.

FIG. 3 illustrate a graph 300 for sound levels of the environment 200. Referring to FIGS. 2 and 3, for example, a source of the sound level 302 can include sound generated by the fan 212, a user 250, or other environmental sounds of the environment 200. The sound level 302 can include multiple time periods 304*a*, 304*b*, 304*c*, . . . , 304*n* (collectively referred to as time periods 304).

Each of the time periods 304 can include multiple time durations. For example, the time period 304*a* can include time durations 306*a*, 306*b*, 306*c*; the time period 304*b* can include the time durations 306*b*, 306*c*, 306*d*; the time period 304*c* can include the time durations 306*c*. 306*d*, and 306*e*; and the time period 304*n* can include time durations 306*x*, 306*y*, 306*z*. The time durations 306*a*, 306*b*, 306*c*, 306*d*, 306*e*, . . . , 306*x*, 306*y*, 306*z* can collectively be referred to as time durations 306. Each of the time periods 304 can include any number of time durations 306 based on a length of time duration 306. For simplicity of illustration, each time period 304 is shown including only three time durations 306; however, each time period 304 can include any number of time periods 304.

Each of the time durations 306 can include multiple instantaneous sound levels.

In some examples, each of the time durations 306 can be 0.1 seconds. In some examples, each of the time durations 306 can be 0.2 seconds. In some examples, each of the time periods 304 can be 60 seconds. For example, when each of the time periods 304 is 60 seconds and the time durations 306 are 0.2 seconds, the time periods 304 can each include 300 time durations 306. For example, when each of the time periods 304 is 60 seconds and the time durations 306 are 0.1 seconds, the time periods 304 can each include 600 time durations 306.

In some examples, at least a portion of consecutive time periods 304 overlap—e.g., time period 304*a* overlaps with portions of time periods 304*b*, 304*c*; time period 304*b* overlaps with portions of time periods 304*a*, 304*c*; and time period 304*c* overlaps with portions of time periods 304*a*. 304*b*. For example, the time duration 306*b* is included by both the time period 304*a* and the time period 304*b*. For example, the time duration 306*c* is included by the time period 304*a*, the time period 304*b*, and the time period 304*c*. For example, the time duration 306*d* is included by both the time period 304*b* and the time period 304*c*.

Figure 5:
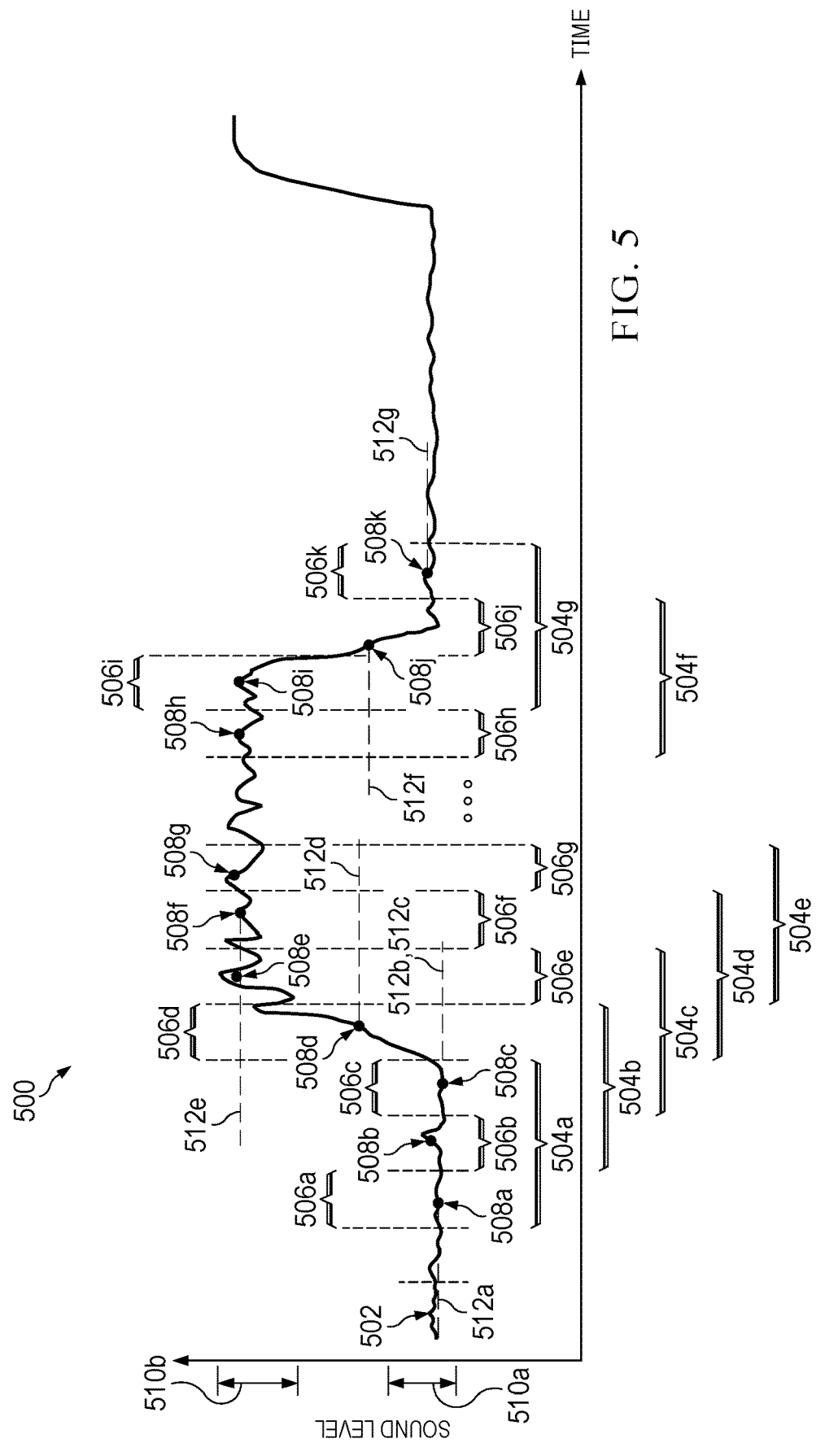

FIG. 5 illustrates a graph 500 for sound levels 502 of the environment 200, similar to that of the graph 300 of FIG. 3.

Figure 4B:
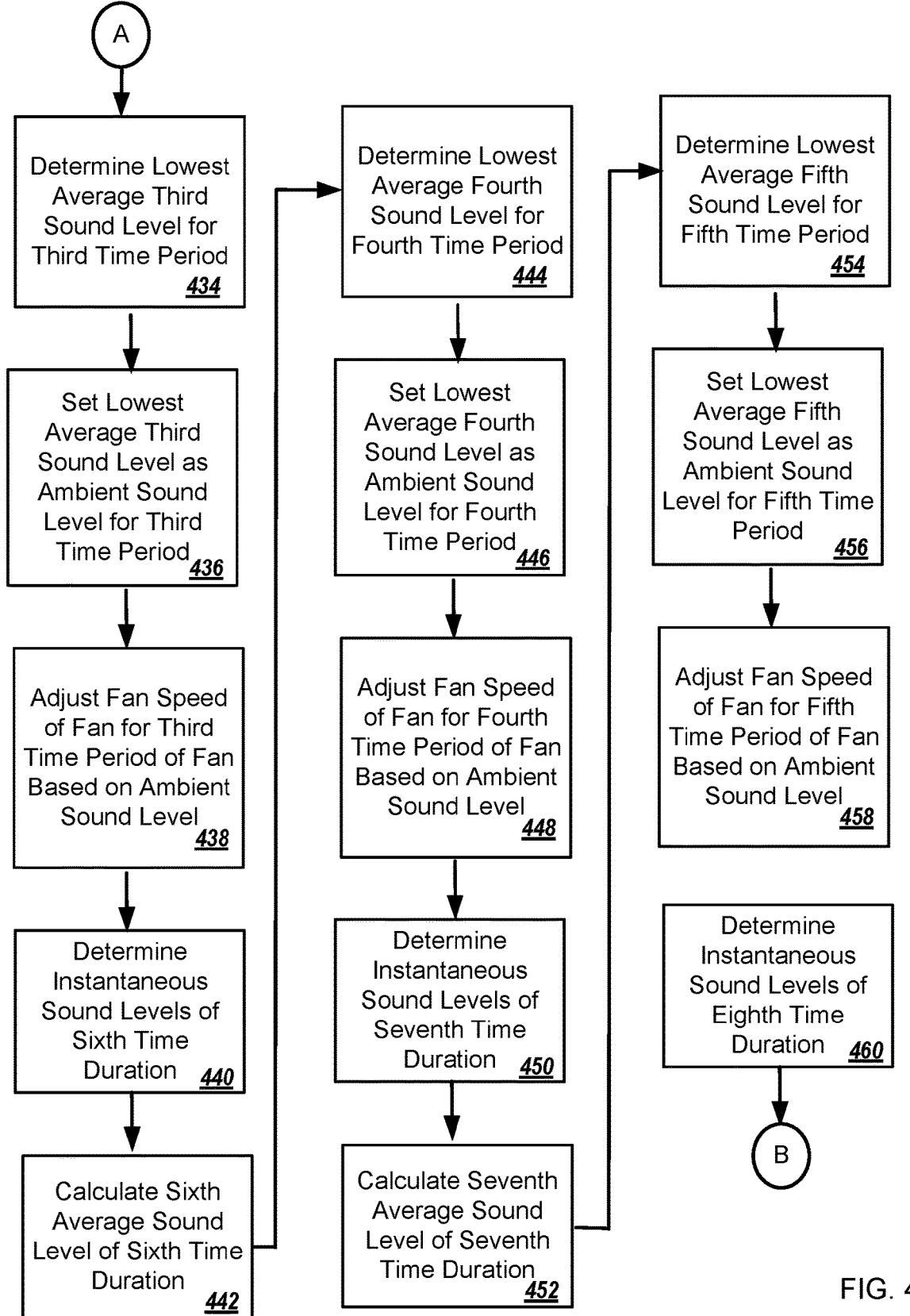
Figure 4C:
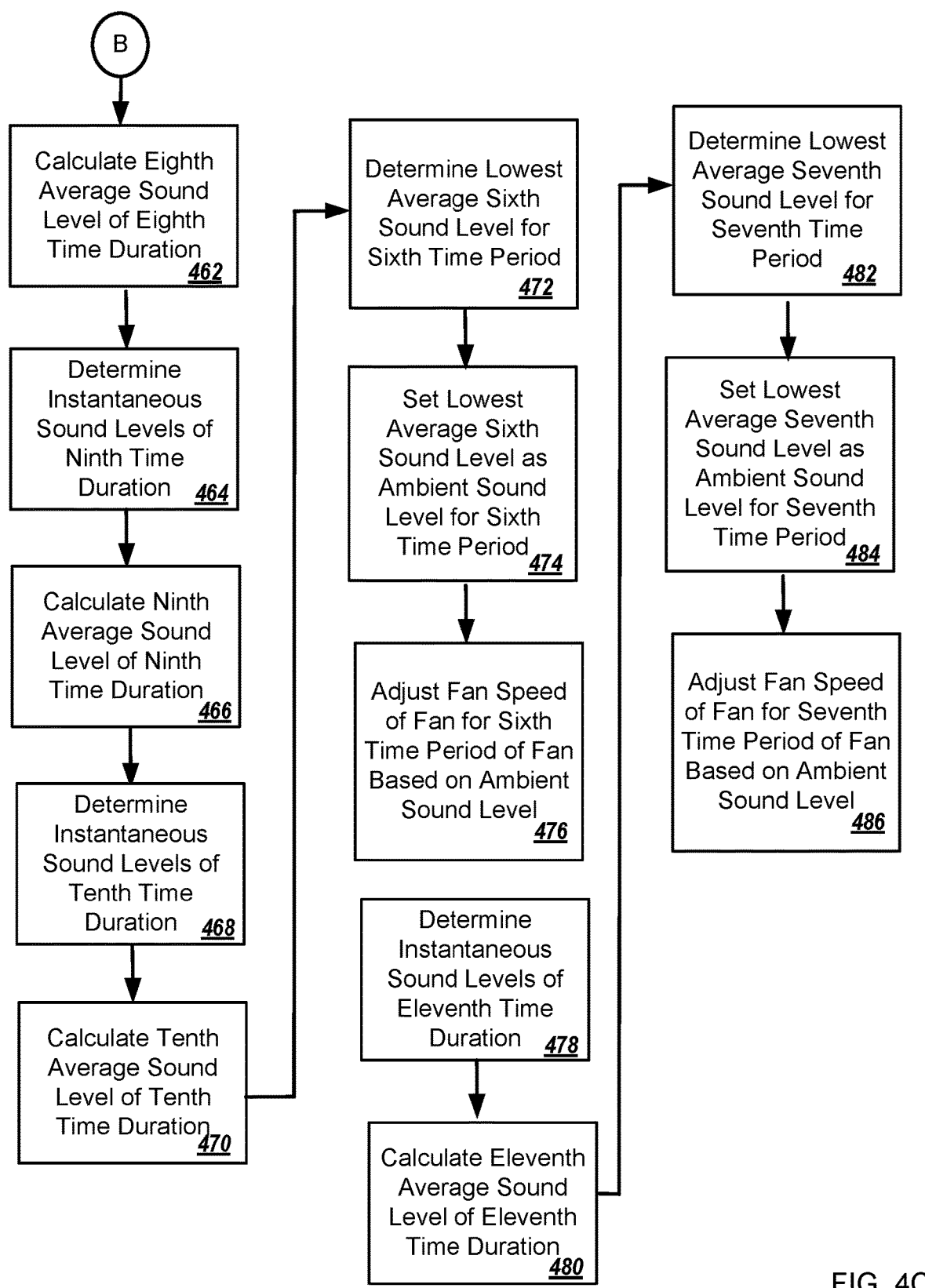

FIGS. 4A, 4B, 4C (collectively referred to as FIG. 4) illustrate a flowchart depicting selected elements of an embodiment of a method 400 for managing sounds levels at an information handling system. The method 400 may be performed by the information handling system 100, the information handling system 202 and/or the sound level management computing module 210, and with reference to FIGS. 1-3 and 5. It is noted that certain operations described in method 400 may be optional or may be rearranged in different embodiments.

The sound level management computing module 210 determines, for a time duration 506*a* of a first time period 504*a*, multiple instantaneous sound levels of the time duration 506*a* of the environment 200 of the information handling system 202, at 402. For example, the first time period 504*a* can include time durations 506*a*, 506*b*, 506*c*.

The sound level management computing module 210 calculates, for the time duration 506*a*, a first average sound level of the time duration 506*a* based on the multiple instantaneous sound levels during the time duration 506*a*, at 404. For example, the sound level management computing module 210 calculates the first average sound level 508*a* of the time duration 506*a* based on the multiple instantaneous sound levels during the time duration 506*a*.

The sound level management computing module 210 determines, for a time duration 506*b* of the first time period 504*a*, multiple instantaneous sound levels of the time duration 506*b* of the environment 200 of the information handling system 202, at 406.

The sound level management computing module 210 calculates, for the time duration 506*b*, a second average sound level of the time duration 506*b* based on the multiple instantaneous sound levels during the time duration 506*b*, at 408. For example, the sound level management computing module 210 calculates the second average sound level 508*b* of the time duration 506*b* based on the multiple instantaneous sound levels during the time duration 506*b*.

The sound level management computing module 210 determines, for a time duration 506*c* of the first time period 504*a*, multiple instantaneous sound levels of the time duration 506*c* of the environment 200 of the information handling system 202, at 410.

The sound level management computing module 210 calculates, for the time duration 506*c*, a third average sound level of the time duration 506*c* based on the multiple instantaneous sound levels during the time duration 506*c*, at 412. For example, the sound level management computing module 210 calculates the third average sound level 508*c* of the time duration 506*c* based on the multiple instantaneous sound levels during the time duration 506*c*.

The sound level management computing module 210 determines, based on the average sound levels 508*a*, 508*b*, 508*c*, a lowest average first sound level from the first time period 504*a*, at 414. In some examples, the lowest average first sound level 512*a* from the first time period 504*a* is the average sound level 508*a*, 508*b*, 508*c* with the absolute lowest magnitude—e.g., the sound average sound level 508*a*. In some examples, the lowest average first sound level from the first time period 504*a* is an average of the average sound levels 508*a*, 508*b*, 508*c*.

In some examples, the lowest average first sound level 512*a* is within a first magnitude range 510*a*.

The sound level management computing module 210 sets the lowest average first sound level 512*a* as an ambient sound level of the environment 200 for the first time period 504*a*, at 416. For example, the sound level management computing module 210 stores data (at a data store, not shown) indicating the lowest average first sound level 512*a* as the ambient sound level of the environment 200 for the first time period 504*a*.

The sound level management computing module 210 adjusts, for the first time period 504*a*, a fan speed of the fan 212 based on the ambient sound level of the environment 200, at 418. For example, the sound level management computing module 210 adjusts, for the first time period 504a, the fan speed of the fan 212 based on the lowest average first sound level 512a. For example, the sound level management computing module 210 adjusts, for the first time period 504a, the fan speed of the fan 212 such that the noise level of the fan 212 is less than the lowest average first sound level 512a.

The sound level management computing module 210 determines, for a time duration 506d of a second time period 504b, multiple instantaneous sound levels of the time duration 506d of the environment 200 of the information handling system 202, at 420. For example, as shown in FIG. 5, the second time period 504b can include time durations 506b, 506c, 506d. In some examples, a portion of the second time period 504b overlaps with a portion of the first time period 504a. That is, time durations 506b and 506c overlap with both the first time period 504a and the second time period 504b.

The sound level management computing module 210 calculates, for the time duration 506d, a fourth average sound level of the time duration 506d based on the multiple instantaneous sound levels during the time duration 506d, at 422. For example, the sound level management computing module 210 calculates the fourth average sound level 508d of the time duration 506d based on the multiple instantaneous sound levels during the time duration 506d.

The sound level management computing module 210 determines, based on the average sound levels 508b, 508c, 508d, a lowest average second sound level from the second time period 504b, at 424. In some examples, the lowest average second sound level 512b from the second time period 504b is the average sound level 508b, 508c, 508d with the absolute lowest magnitude—e.g., the sound average sound level 508c. In some examples, the lowest average second sound level from the second time period 504b is an average of the average sound levels 508b, 508c, 508d.

In some examples, the lowest average second sound level 512b is within the first magnitude range 510a.

The sound level management computing module 210 sets the lowest average second sound level 512b as an ambient sound level of the environment 200 for the second time period 504b, at 426. For example, the sound level management computing module 210 stores data (at a data store, not shown) indicating the lowest average second sound level 512b as the ambient sound level of the environment 200 for the second time period 504b.

The sound level management computing module 210 adjusts, for the second time period 504b, the fan speed of the fan 212 based on the ambient sound level of the environment 200, at 428. For example, the sound level management computing module 210 adjusts, for the second time period 504b, the fan speed of the fan 212 based on the lowest average second sound level 512b. For example, the sound level management computing module 210 adjusts, for the second time period 504b, the fan speed of the fan 212 such that the noise level of the fan 212 is less than the lowest average second sound level 512b.

The sound level management computing module 210 determines, for a time duration 506e of a third time period 504c, multiple instantaneous sound levels of the time duration 506e of the environment 200 of the information handling system 202, at 430. For example, as shown in FIG. 5, the third time period 504c can include time durations 506c, 506d, 506e. In some examples, a portion of the third time period 504c overlaps with a portion of the second time period 504b. That is, time durations 506c and 506d overlap with both the second time period 504b and the third time period 504c.

The sound level management computing module 210 calculates, for the time duration 506e, a fifth average sound level of the time duration 506e based on the multiple instantaneous sound levels during the time duration 506e, at 432. For example, the sound level management computing module 210 calculates the fifth average sound level 508e of the time duration 506e based on the multiple instantaneous sound levels during the time duration 506e.

The sound level management computing module 210 determines, based on the average sound levels 508c, 508d, 508e, a lowest average third sound level from the third time period 504c, at 434. In some examples, the lowest average third sound level 512c from the third time period 504c is the average sound level 508c, 508d, 508e with the absolute lowest magnitude—e.g., the sound average sound level 508c. In some examples, the lowest average third sound level 512c is the same as the lowest average sound level 512b. In some examples, the lowest average third sound level from the third time period 504c is an average of the average sound levels 508c, 508d, 508c.

In some examples, the lowest average third sound level 512c is within the first magnitude range 510a.

The sound level management computing module 210 sets the lowest average third sound level 512c as the ambient sound level of the environment 200 for the third time period 504c, at 436. For example, the sound level management computing module 210 stores data (at a data store, not shown) indicating the lowest average third sound level 512c as the ambient sound level of the environment 200 for the third time period 504c.

The sound level management computing module 210 adjusts, for the third time period 504c, the fan speed of the fan 212 based on the ambient sound level of the environment 200, at 438. For example, the sound level management computing module 210 adjusts, for the third time period 504c, the fan speed of the fan 212 based on the lowest average third sound level 512c. For example, the sound level management computing module 210 adjusts, for the third time period 504c, the fan speed of the fan 212 such that the noise level of the fan 212 is less than the lowest average third sound level 512c.

The sound level management computing module 210 determines, for a time duration 506f of a fourth time period 504d, multiple instantaneous sound levels of the time duration 506f of the environment 200 of the information handling system 202, at 440. For example, as shown in FIG. 5, the fourth time period 504d can include time durations 506d, 506e, 506f. In some examples, a portion of the fourth time period 504d overlaps with a portion of the third time period 504c. That is, time durations 506d and 506e overlap with both the third time period 504c and the fourth time period 504d.

The sound level management computing module 210 calculates, for the time duration 506f, a sixth average sound level of the time duration 506f based on the multiple instantaneous sound levels during the time duration 506f, at 442. For example, the sound level management computing module 210 calculates the sixth average sound level 508f of the time duration 506f based on the multiple instantaneous sound levels during the time duration 506f.

The sound level management computing module 210 determines, based on the average sound levels 508d, 508e, 508f, a lowest average fourth sound level from the fourth time period 504d, at 444. In some examples, the lowest average fourth sound level 512d from the fourth time period 504d is the average sound level 508d, 508e, 508f with the absolute lowest magnitude—e.g., the sound average sound level 508d. In some examples, the lowest average fourth sound level from the fourth time period 504d is an average of the average sound levels 508d, 508e, 508f.

In some examples, the lowest average fourth sound level 512d is greater than the first magnitude range 510a.

The sound level management computing module 210 sets the lowest average fourth sound level 512d as the ambient sound level of the environment 200 for the fourth time period 504d, at 446. For example, the sound level management computing module 210 stores data (at a data store, not shown) indicating the lowest average fourth sound level 512d as the ambient sound level of the environment 200 for the fourth time period 504d.

The sound level management computing module 210 adjusts, for the fourth time period 504d, the fan speed of the fan 212 based on the ambient sound level of the environment 200, at 448. For example, the sound level management computing module 210 adjusts, for the fourth time period 504d, the fan speed of the fan 212 based on the lowest average fourth sound level 512d. For example, the sound level management computing module 210 adjusts, for the fourth time period 504d, the fan speed of the fan 212 such that the noise level of the fan 212 is less than the lowest average fourth sound level 512d.

The sound level management computing module 210 determines, for a time duration 506g of a fifth time period 504e, multiple instantaneous sound levels of the time duration 506g of the environment 200 of the information handling system 202, at 450. For example, as shown in FIG. 5, the fifth time period 504e can include time durations 506e, 506f, 506g. In some examples, a portion of the fifth time period 504e overlaps with a portion of the fourth time period 504d. That is, time durations 506e and 506f overlap with both the fourth time period 504d and the fifth time period 504c.

The sound level management computing module 210 calculates, for the time duration 506g, a seventh average sound level of the time duration 506g based on the multiple instantaneous sound levels during the time duration 506g, at 452. For example, the sound level management computing module 210 calculates the seventh average sound level 508g of the time duration 506g based on the multiple instantaneous sound levels during the time duration 506g.

The sound level management computing module 210 determines, based on the average sound levels 508e, 508f, 508g, a lowest average fifth sound level from the fifth time period 504c, at 454. In some examples, the lowest average fifth sound level 512e from the fifth time period 504e is the average sound level 508e, 508f, 508h with the absolute lowest magnitude—e.g., the sound average sound level 508f. In some examples, the lowest average fifth sound level from the fifth time period 504e is an average of the average sound levels 508c, 508f, 508g.

In some examples, the lowest average fifth sound level 512c is within a second magnitude range 510b. The second magnitude range 510b is greater than the first magnitude range 510a. In some examples, the second magnitude range 510b is an order of magnitude greater than the first magnitude range 510a.

The sound level management computing module 210 sets the lowest average fifth sound level 512e as the ambient sound level of the environment 200 for the fifth time period 504e, at 456. For example, the sound level management computing module 210 stores data (at a data store, not shown) indicating the lowest average fifth sound level 512e as the ambient sound level of the environment 200 for the fifth time period 504e.

The sound level management computing module 210 adjusts, for the fifth time period 504e, the fan speed of the fan 212 based on the ambient sound level of the environment 200, at 458. For example, the sound level management computing module 210 adjusts, for the fifth time period 504e, the fan speed of the fan 212 based on the lowest average fifth sound level 512e. For example, the sound level management computing module 210 adjusts, for the fifth time period 504e, the fan speed of the fan 212 such that the noise level of the fan 212 is less than the lowest average fifth sound level 512e.

The sound level management computing module 210 determines, for a time duration 506h of a sixth time period 504f, multiple instantaneous sound levels of the time duration 506h of the environment 200 of the information handling system 202, at 460. For example, as shown in FIG. 5, the sixth time period 504f can include time durations 506h, 506i, 506j.

The sound level management computing module 210 calculates, for the time duration 506h, an eighth average sound level of the time duration 506h based on the multiple instantaneous sound levels during the time duration 506h, at 462. For example, the sound level management computing module 210 calculates the eighth average sound level 508h of the time duration 506h based on the multiple instantaneous sound levels during the time duration 506h.

The sound level management computing module 210 determines, for a time duration 506i of the sixth time period 504f, multiple instantaneous sound levels of the time duration 506i of the environment 200 of the information handling system 202, at 464.

The sound level management computing module 210 calculates, for the time duration 506i, a ninth average sound level of the time duration 506i based on the multiple instantaneous sound levels during the time duration 506i, at 466. For example, the sound level management computing module 210 calculates the ninth average sound level 508i of the time duration 506b based on the multiple instantaneous sound levels during the time duration 506i.

The sound level management computing module 210 determines, for a time duration 506j of the sixth time period 504f, multiple instantaneous sound levels of the time duration 506j of the environment 200 of the information handling system 202, at 468.

The sound level management computing module 210 calculates, for the time duration 506j, a tenth average sound level of the time duration 506j based on the multiple instantaneous sound levels during the time duration 506j, at 470. For example, the sound level management computing module 210 calculates the tenth average sound level 508j of the time duration 506j based on the multiple instantaneous sound levels during the time duration 506j.

The sound level management computing module 210 determines, based on the average sound levels 508h, 508i, 508j, a lowest average sixth sound level from the sixth time period 504f, at 472. In some examples, the lowest average sixth sound level 512f from the sixth time period 504f is the average sound level 508h, 508i, 508j with the absolute lowest magnitude—e.g., the sound average sound level 508j. In some examples, the lowest average sixth sound level from the sixth time period 504f is an average of the average sound levels 508h, 508i, 508j.

In some examples, the lowest average sixth sound level 512f is less than the second magnitude range 510b.

The sound level management computing module 210 sets the lowest average sixth sound level 512f as an ambient sound level of the environment 200 for the sixth time period 504f, at 474. For example, the sound level management computing module 210 stores data (at a data store, not shown) indicating the lowest average sixth sound level 512f as the ambient sound level of the environment 200 for the sixth time period 504f.

The sound level management computing module 210 adjusts, for the sixth time period 504f, a fan speed of the fan 212 based on the ambient sound level of the environment 200, at 476. For example, the sound level management computing module 210 adjusts, for the sixth time period 504f, the fan speed of the fan 212 based on the lowest average sixth sound level 512f. For example, the sound level management computing module 210 adjusts, for the sixth time period 504f, the fan speed of the fan 212 to be less than the lowest average sixth sound level 512f.

The sound level management computing module 210 determines, for a time duration 506k of a seventh time period 504g, multiple instantaneous sound levels of the time duration 506k of the environment 200 of the information handling system 202, at 478. For example, as shown in FIG. 5, the seventh time period 504g can include time durations 506i, 506j, 506k.

The sound level management computing module 210 calculates, for the time duration 506k, an eleventh average sound level of the time duration 506k based on the multiple instantaneous sound levels during the time duration 506k, at 480. For example, the sound level management computing module 210 calculates the eleventh average sound level 508k of the time duration 506k based on the multiple instantaneous sound levels during the time duration 506k.

The sound level management computing module 210 determines, based on the average sound levels 508i, 508j, 508k, a lowest average seventh sound level from the seventh time period 504g, at 482. In some examples, the lowest average seventh sound level 512g from the seventh time period 504g is the average sound level 508i, 508j, 508k with the absolute lowest magnitude—e.g., the sound average sound level 508k. In some examples, the lowest average seventh sound level from the seventh time period 504g is an average of the average sound levels 508i, 508j, 508k.

In some examples, the lowest average seventh sound level 512g is within the first magnitude range 510a.

The sound level management computing module 210 sets the lowest average seventh sound level 512g as an ambient sound level of the environment 200 for the seventh time period 504g, at 484. For example, the sound level management computing module 210 stores data (at a data store, not shown) indicating the lowest average seventh sound level 512g as the ambient sound level of the environment 200 for the seventh time period 504g.

The sound level management computing module 210 adjusts, for the seventh time period 504g, a fan speed of the fan 212 based on the ambient sound level of the environment 200, at 486. For example, the sound level management computing module 210 adjusts, for the seventh time period 504g, the fan speed of the fan 212 based on the lowest average seventh sound level 512g. For example, the sound level management computing module 210 adjusts, for the seventh time period 504g, the fan speed of the fan 212 to be less than the lowest average seventh sound level 512g.

To that end, the ambient sound level of the environment 200 is within the first magnitude range 510a for the time periods 504a, 504b, 504c; and only within the second magnitude range 510b for the time period 504e. That is, although the time period 504b includes the average sound level 508d that is above the first magnitude range 510a, and the time period 504c includes the average sound levels 508d, 508e that are all above the first magnitude range 510a, the ambient sound level for time periods 504b, 504c remain within the first magnitude range 510a. Thus, for time periods 504a-504c, the ambient sound level is within the first magnitude range 510a. In other words, there is a slow ramp-up of the detected ambient sound level for the environment 200 in view of the increasing sound level 502 during time periods 504b, 504c.

As a result, the noise generated by the fan 212 is slowly increased in view of the increasing sound level 502. That is, the noise generated by the fan 212 is less than the ambient sound level for the time periods 504a, 504b, 504c (and within the first magnitude range 510a) in view of the increasing sound level 502. Thus, sudden increases in the sound level 502 does not result in immediate increase in the sound generated by the fan 212 (increase in fan speed). Rather, the increased sound level 502 is to be sustained over a longer period of time to result in an increase in fan speed of the fan 212 (and increase in fan noise of the fan 212). For example, sudden increases in the ambient sound level (e.g., a human talking) does not result in an increase in fan speed and fan noise of the fan 212.

Similarly, the ambient sound level of the environment 200 is within the first magnitude range 510a for the time period 504g. That is, although the time period 504g includes the average sound level 508i, 508j that are all above the first magnitude range 510a, the ambient sound level for the time period 504g changes to the first magnitude range 510a. Thus, for the time period 504g, the ambient sound level is within the first magnitude range 510a. In other words, there is quick ramp-down of the detected ambient sound level for the environment 200 in view of the decreasing sound level 502 during the time periods 504f, 504g. For example, the ambient sound level is decreasing initially in time period 504f (based on average sound level 508j) and fully decreasing in time period 504g.

As a result, the noise generated by the fan 212 is decreased rapidly in view of the decreasing sound level 502. That is, the noise generated by the fan 212 is less than the ambient sound level for the time period 504g in view of the decreasing sound level 502. Thus, sudden decreases in the sound level 502 results in immediate decrease in the sound level generated by the fan 212 (decrease in fan speed). For example, sudden decreases in the ambient sound level (e.g., a human stop talking—temporarily (for breathing) or longer) results in a sudden decrease in fan speed and fan noise of the fan 212.

Figure 6:
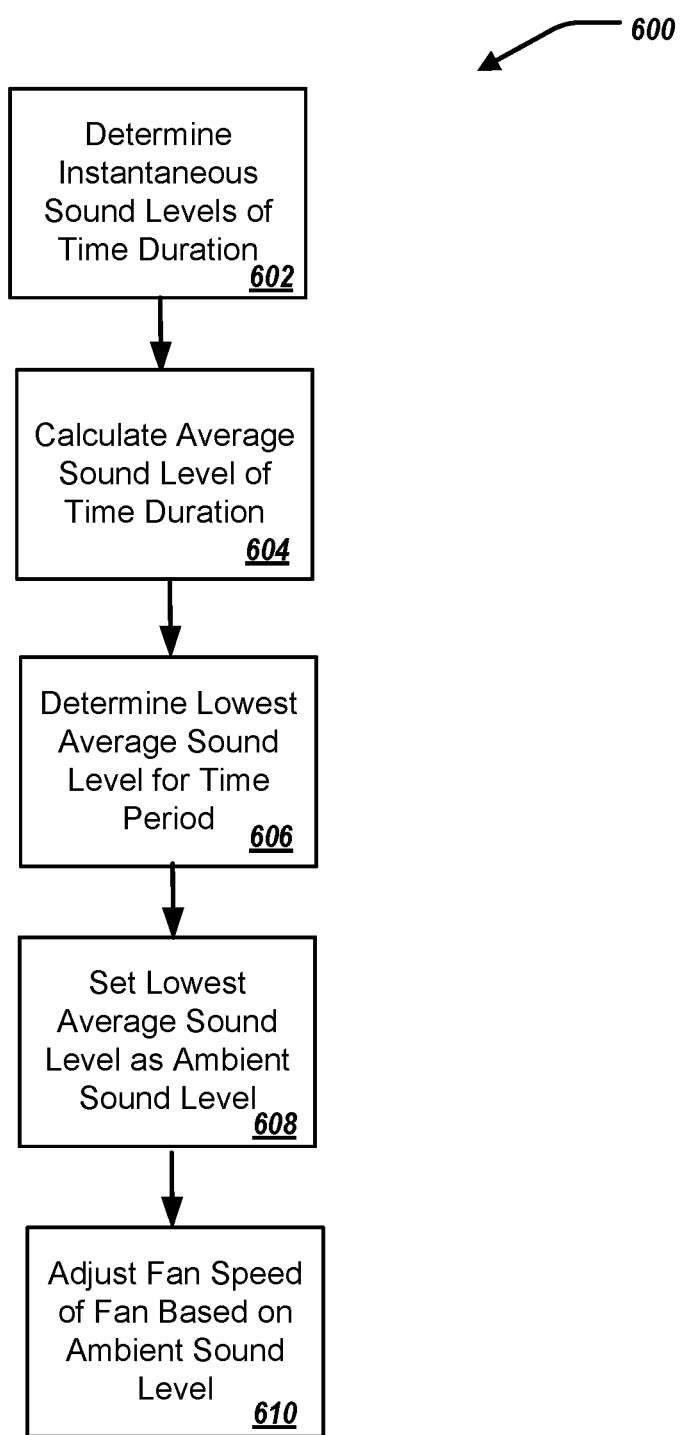
FIG. 6 illustrates a method for managing sound levels at the information handling system.

FIG. 6 illustrates a flowchart depicting selected elements of an embodiment of a method 600 for managing sounds levels at an information handling system. The method 600 may be performed by the information handling system 100, the information handling system 202 and/or the sound level management computing module 210, and with reference to FIGS. 1-3 and 5. It is noted that certain operations described in method 600 may be optional or may be rearranged in different embodiments.

The sound level management computing module 210 determines, for each time duration 306 of a time period 304, multiple instantaneous sound levels of the time duration 306 of the environment 200 of the information handling system 202, at 602. In some examples, A-weighting can be applied to the multiple instantaneous sound levels of the time duration 306. Each of the time durations 306 is less than the time period 304. In some examples, each of the time durations is approximately 0.2 seconds and the first time period is approximately 60 seconds. In some examples, each of the time durations is approximately 0.1 seconds and the first time period is approximately 60 seconds.

The sound level management computing module 210 calculates, for the time duration 306 of the time period 304, an average sound level of the time duration 306 based on the multiple instantaneous sound levels during the time duration 306, at 604.

The sound level management computing module 210 determines, based on the average sound levels of each time duration 306 of the time period 304, a lowest average sound level from the time period 304, at 606. In some examples, the lowest average sound level from the time period 304 is the average sound level with the absolute lowest magnitude. In some examples, the lowest average sound level from the time period 304 is an average of the average sound levels for the time period 304.

The sound level management computing module 210 sets the lowest average sound level as an ambient sound level of the environment 200 for the time period 304, at 608. For example, the sound level management computing module 210 stores data (at a data store, not shown) indicating the lowest average sound level as the ambient sound level of the environment 200 for the time period 304.

The sound level management computing module 210 adjusts, for the time period 304, a fan speed of the fan 212 based on the ambient sound level of the environment 200, at 610. For example, the sound level management computing module 210 adjusts, for the time period 304, the fan speed of the fan 212 to be less than the lowest average sound level.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing sound levels at an information handling system, including:
   determining, for each time duration of multiple time durations over a first time period, multiple instantaneous sound levels of the time duration of an environment of the information handling system;
   calculating, for each time duration of the multiple time durations over the first time period, an average sound level of the time duration based on the multiple instantaneous sound levels of the time duration;
   determining, based on the average sound level of each time duration of the multiple time durations over the first time period, a lowest average first sound level for the first time period;
   setting the lowest average first sound level as an ambient sound level of the environment of the information handling system for the first time period;
   adjusting, for the first time period, a fan speed of a fan of the information handling system based on the ambient sound level of environment such that a noise level of the fan is less than the ambient sound level of the environment for the first time period;
   determining, for each time duration of multiple time durations over a second time period, multiple instantaneous sound levels of the time duration of the environment of the information handling system;
   calculating, for each time duration of the multiple time durations over the second time period, an average sound level of the time duration based on the multiple instantaneous sound levels of the time duration;
   determining, based on the average sound level of each time duration of the multiple time durations over the second time period, a lowest average second sound level for the second time period;
   setting the lowest average second sound level as the ambient sound level of the environment of the information handling system for the second time period; and
   adjusting, for the second time period, the fan speed of the fan of the information handling system based on the ambient sound level of environment such that the noise level of the fan is less than the ambient sound level of the environment for the second time period,
   wherein the second time period partially overlaps with the first time period.

2. The computer-implemented method of claim 1, further comprising:
   determining, for each time duration of multiple time durations over a third time period, multiple instantaneous sound levels of the time duration of the environment of the information handling system;
   calculating, for each time duration of the multiple time durations over the third time period, an average sound level of the time duration based on the multiple instantaneous sound levels during the time duration;
   determining, based on the average sound level of each time duration of the multiple time durations over the third time period, a lowest average third sound level for the third time period;
   setting the lowest average third sound level as the ambient sound level of the environment of the information handling system for the third time period; and adjusting, for the third time period, the fan speed of the fan of the information handling system based on the ambient sound level of environment such that the noise level of the fan is less than the ambient sound level of the environment for the third time period, wherein the third time period partially overlaps with the second time period.

3. The computer-implemented method of claim 2, wherein the third time period partially overlaps with the first time period.

4. The computer-implemented method of claim 3, wherein the first time period includes a first time duration, a second time duration, and a third time duration, the method further including:

calculating, for the first time duration, a first average sound level of the first time duration based on the multiple instantaneous sound levels during the first time duration, wherein the first average sound level is within a first magnitude range;

calculating, for the second time duration after the first time duration, a second average sound level of the second time duration based on the multiple instantaneous sound levels during the second time duration, wherein the second average sound level is within a second magnitude range greater than the first magnitude range;

calculating, for the third time duration after the second time duration, a third average sound level of the third time duration based on the multiple instantaneous sound levels during the third time duration, wherein the third average sound level is within the second magnitude range; and determining, based on the first average sound level, the second average sound level, and the third average sound level, the lowest average first sound level for the first time period, wherein the lowest average first sound level for the first time period is within the first magnitude range.

5. The computer-implemented method of claim 4, wherein the second time period includes the second time duration, the third time duration, and a fourth time duration, the method further including:

calculating, for the fourth time duration after the third time duration, a fourth average sound level of the fourth time duration based on the multiple instantaneous sound levels during the fourth time duration, wherein the fourth average sound level is within the second magnitude range; and determining, based on the second average sound level, the third average sound level, and the fourth average sound level, the lowest average second sound level for the second time period, wherein the lowest average second sound level for the second time period is within the second magnitude range.

6. The computer-implemented method of claim 5, wherein the third time period includes the third time duration, the fourth time duration, and a fifth time duration, the method further including further including:

calculating, for the fifth time duration after the fourth time duration, a fifth average sound level of the fifth time duration based on the multiple instantaneous sound levels during the fifth time duration, wherein the fifth average sound level is within the first magnitude range; and determining, based on the third average sound level, the fourth average sound level, and the fifth average sound level, the lowest average third sound level for the third time period, wherein the lowest average third sound level for the third time period is within the first magnitude range.

7. The computer-implemented method of claim 1, wherein each of the time durations is less than the first time period.

8. The computer-implemented method of claim 1, wherein each of the time durations is approximately 0.2 seconds and the first time period is approximately 60 seconds.

9. The computer-implemented method of claim 1, wherein each of the time durations is approximately 0.1 seconds and the first time period is approximately 60 seconds.

10. An information handling system, comprising:

a fan;

a microphone configured to record sound levels of an environment of the information handling system;

a processor;

memory media storing instructions executable by the processor to perform operations, comprising:

determining, for each time duration of multiple time durations over a first time period, multiple instantaneous sound levels of the time duration of an environment of the information handling system;

calculating, for each time duration of the multiple time durations over the first time period, an average sound level of the time duration based on the multiple instantaneous sound levels of the time duration;

determining, based on the average sound level of each time duration of the multiple time durations over the first time period, a lowest average first sound level for the first time period;

setting the lowest average first sound level as an ambient sound level of the environment of the information handling system for the first time period;

adjusting, for the first time period, a fan speed of a fan of the information handling system based on the ambient sound level of environment such that a noise level of the fan is less than the ambient sound level of the environment for the first time period;

determining, for each time duration of multiple time durations over a second time period, multiple instantaneous sound levels of the time duration of the environment of the information handling system;

calculating, for each time duration of the multiple time durations over the second time period, an average sound level of the time duration based on the multiple instantaneous sound levels of the time duration;

determining, based on the average sound level of each time duration of the multiple time durations over the second time period, a lowest average second sound level for the second time period;

setting the lowest average second sound level as the ambient sound level of the environment of the information handling system for the second time period; and adjusting, for the second time period, the fan speed of the fan of the information handling system based on the ambient sound level of environment such that the noise level of the fan is less than the ambient sound level of the environment for the second time period, wherein the second time period partially overlaps with the first time period.

11. The information handling system of claim 10, the operations further comprising:

determining, for each time duration of multiple time durations over a third time period, multiple instantaneous sound levels of the time duration of the environment of the information handling system;

calculating, for each time duration of the multiple time durations over the third time period, an average sound level of the time duration based on the multiple instantaneous sound levels during the time duration;

determining, based on the average sound level of each time duration of the multiple time durations over the third time period, a lowest average third sound level for the third time period;

setting the lowest average third sound level as the ambient sound level of the environment of the information handling system for the third time period; and adjusting, for the third time period, the fan speed of the fan of the information handling system based on the ambient sound level of environment such that the noise level of the fan is less than the ambient sound level of the environment for the third time period, wherein the third time period partially overlaps with the second time period.

12. The information handling system of claim 11, wherein the third time period partially overlaps with the first time period.

13. The information handling system of claim 12, wherein the first time period includes a first time duration, a second time duration, and a third time duration, the operations further including:

calculating, for the first time duration, a first average sound level of the first time duration based on the multiple instantaneous sound levels during the first time duration, wherein the first average sound level is within a first magnitude range;

calculating, for the second time duration after the first time duration, a second average sound level of the second time duration based on the multiple instantaneous sound levels during the second time duration, wherein the second average sound level is within a second magnitude range greater than the first magnitude range;

calculating, for the third time duration after the second time duration, a third average sound level of the third time duration based on the multiple instantaneous sound levels during the third time duration, wherein the third average sound level is within the second magnitude range; and determining, based on the first average sound level, the second average sound level, and the third average sound level, the lowest average first sound level for the first time period, wherein the lowest average first sound level for the first time period is within the first magnitude range.

14. The information handling system of claim 13, wherein the second time period includes the second time duration, the third time duration, and a fourth time duration, the operations further including:

calculating, for the fourth time duration after the third time duration, a fourth average sound level of the fourth time duration based on the multiple instantaneous sound levels during the fourth time duration, wherein the fourth average sound level is within the second magnitude range; and determining, based on the second average sound level, the third average sound level, and the fourth average sound level, the lowest average second sound level for the second time period, wherein the lowest average second sound level for the second time period is within the second magnitude range.

15. The information handling system of claim 14, wherein the third time period includes the third time duration, the fourth time duration, and a fifth time duration, the operations further including further including:

calculating, for the fifth time duration after the fourth time duration, a fifth average sound level of the fifth time duration based on the multiple instantaneous sound levels during the fifth time duration, wherein the fifth average sound level is within the first magnitude range; and determining, based on the third average sound level, the fourth average sound level, and the fifth average sound level, the lowest average third sound level for the third time period, wherein the lowest average third sound level for the third time period is within the first magnitude range.

16. The information handling system of claim 10, wherein each of the time durations is less than the first time period.

17. The information handling system of claim 10, wherein each of the time durations is approximately 0.2 seconds and the first time period is approximately 60 seconds.

18. A non-transitory computer-readable medium storing software comprising instructions executable by one or more computers which, upon such execution, cause the one or more computers to perform operations comprising:

determining, for each time duration of multiple time durations over a first time period, multiple instantaneous sound levels of the time duration of an environment of the information handling system;

calculating, for each time duration of the multiple time durations over the first time period, an average sound level of the time duration based on the multiple instantaneous sound levels of the time duration;

determining, based on the average sound level of each time duration of the multiple time durations over the first time period, a lowest average first sound level for the first time period;

setting the lowest average first sound level as an ambient sound level of the environment of the information handling system for the first time period;

adjusting, for the first time period, a fan speed of a fan of the information handling system based on the ambient sound level of environment;

determining, for each time duration of multiple time durations over a second time period, multiple instantaneous sound levels of the time duration of the environment of the information handling system;

calculating, for each time duration of the multiple time durations over the second time period, an average sound level of the time duration based on the multiple instantaneous sound levels of the time duration;

determining, based on the average sound level of each time duration of the multiple time durations over the second time period, a lowest average second sound level for the second time period;

setting the lowest average second sound level as the ambient sound level of the environment of the information handling system for the second time period; and adjusting, for the second time period, the fan speed of the fan of the information handling system based on the ambient sound level of environment such that the noise level of the fan is less than the ambient sound level of the environment for the second time period, wherein the second time period partially overlaps with the first time period.

* * * * *